(12) United States Patent
Richardson et al.

(10) Patent No.: US 9,151,374 B2
(45) Date of Patent: Oct. 6, 2015

(54) HYDROSTATIC TRANSMISSION WITH INTEGRATED PUMP AND MOTOR

(71) Applicant: Parker-Hannifin Corporation, Cleveland, OH (US)

(72) Inventors: Jason Scot Richardson, Chuckey, TN (US); Richard C. Hynes, Chuckey, TN (US); Michael Crosby, Jonesborough, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 14/306,544

(22) Filed: Jun. 17, 2014

(65) Prior Publication Data

US 2014/0367180 A1 Dec. 18, 2014

Related U.S. Application Data

(60) Provisional application No. 61/835,777, filed on Jun. 17, 2013.

(51) Int. Cl.
| | |
|---|---|
| *F04B 23/02* | (2006.01) |
| *F16H 39/04* | (2006.01) |
| *F04B 17/06* | (2006.01) |
| *F03C 1/26* | (2006.01) |

(52) U.S. Cl.
CPC *F16H 39/04* (2013.01); *F03C 1/26* (2013.01); *F04B 17/06* (2013.01)

(58) Field of Classification Search
CPC ............ F16H 30/04; F04B 17/06; F03C 1/26
See application file for complete search history.

(56) References Cited

U.S. PATENT DOCUMENTS

| | | | | |
|---|---|---|---|---|
| 5,921,151 | A * | 7/1999 | Louis et al. ................. | 74/606 R |
| 6,152,247 | A * | 11/2000 | Sporrer et al. ............... | 180/6.28 |
| 6,301,885 | B1 * | 10/2001 | Johnson et al. .................. | 60/487 |
| 6,775,976 | B1 * | 8/2004 | Phanco et al. ................... | 60/484 |
| 6,843,056 | B1 * | 1/2005 | Langenfeld et al. ............ | 60/464 |
| 7,886,534 | B2 | 2/2011 | Dong et al. | |
| 8,100,204 | B2 | 1/2012 | Dong et al. | |
| 8,443,598 | B1 | 5/2013 | Hauser et al. | |
| 8,800,694 | B1 * | 8/2014 | Bonny et al. .................. | 180/6.34 |
| 2006/0039801 | A1 * | 2/2006 | Dong et al. .................... | 417/269 |
| 2008/0120974 | A1 | 5/2008 | Dong et al. | |

* cited by examiner

*Primary Examiner* — Tony Winner
(74) *Attorney, Agent, or Firm* — Renner, Otto, Boisselle & Sklar, LLP (57) ABSTRACT

A hydrostatic transmission includes a hydraulic pump, a top housing that houses the hydraulic pump, and a hydraulic motor. An endblock sub-assembly has a pump running face for interfacing with the hydraulic pump, and a motor connection portion for interfacing with a hydraulic motor. The enblock sub-assembly forms a porting manifold for communicating hydraulic fluid from the hydraulic pump to the hydraulic motor. The hydraulic motor includes an internal rotor set, and the hydraulic motor is secured to the endblock sub-assembly in a manner that permits rotation of the rotor set. The top housing is fixed to the endblock sub-assembly such that the housing and endblock sub-assembly form a reservoir for the hydraulic fluid. The motor connection portion of the endblock sub-assembly supports the hydraulic motor externally to the top housing. The hydrostatic transmission is suitable for incorporation into various light vehicle categories, including zero-turn radius vehicles.

20 Claims, 11 Drawing Sheets

HYDROSTATIC TRANSMISSION WITH INTEGRATED PUMP AND MOTOR

RELATED APPLICATIONS

This application claims the benefit of U.S. Provisional Application No. 61/835,777 filed Jun. 17, 2013, which is incorporated herein by reference.

FIELD OF INVENTION

The present invention relates generally to transmissions, and more particularly to hydrostatic transmissions for use in light vehicles, such as turf mowing machines and zero-turn radius vehicles.

BACKGROUND

A prime mover, such as an internal combustion engine or the like, can be connected to a hydrostatic transmission to drive a wheel in a light vehicle. A hydrostatic transmission is particularly suitable to provide traction drive for light vehicles such as turf machines, lawn tractors, ride-on lawn mowers, and like devices. A hydrostatic transmission may be connected to a variety of gearboxes and transaxles, so the same components can be utilized on a wide variety of light vehicle models. A simple usage of hydrostatic transmissions is on zero-turn radius vehicles, including zero-turn radius mowers and tractors.

Generally, a hydrostatic transmission includes a variable displacement hydraulic pump connected in a closed hydraulic circuit with a fixed or variable displacement hydraulic motor. The hydraulic pump usually is a piston-type pump including a plurality of reciprocating pistons, which are in fluid communication through hydraulic porting with the hydraulic motor. Rotation of the hydraulic pump against a moveable swash plate creates an axial motion of the pump pistons that forces hydraulic fluid through the hydraulic porting to the hydraulic motor to drive the motor, which allows the transmission output speed to be varied and controlled. The rotation of the hydraulic motor may be used to drive an output shaft, which in turn ultimately drives a wheel axle of a light vehicle of the types described above.

In some vehicles, such as zero-turn-radius mowers, separate hydraulic pumps and motors are used to independently drive separate wheels of an axle. By independently driving the wheels in opposite directions, for example, the vehicle can be made to turn with zero radius. Zero-turn-radius mowers are increasingly popular as the size and costs of such mowers decrease. As the size of such mowers decreases, however, the space available for the hydraulic components and/or the prime mover also decreases.

SUMMARY OF INVENTION

The hydrostatic transmission of the present invention includes a hydraulic pump, a top housing that houses the hydraulic pump, and a hydraulic motor. An endblock sub-assembly has a pump running face for interfacing with the hydraulic pump, and a motor connection portion for interfacing with a hydraulic motor. The enblock sub-assembly forms a porting manifold for communicating hydraulic fluid from the hydraulic pump to the hydraulic motor. The hydraulic motor includes an internal rotor set, and the hydraulic motor is secured to the motor connection portion of the endblock sub-assembly in a manner that permits rotation of the rotor set. The top housing is fixed to the endblock sub-assembly such that the housing and endblock sub-assembly form a reservoir for the hydraulic fluid.

The configuration by which the top housing and endblock sub-assembly form a reservoir for the hydraulic fluid has advantages over conventional configurations. The volume enclosed by the top housing is sufficient to define an internal expansion volume into which the fluid in the reservoir can expand. This eliminates the need for a separate, external expansion tank installed on the hydrostatic transmission as is utilized in conventional configurations.

In this hydrostatic transmission, the motor connection portion of the endblock sub-assembly supports the hydraulic motor externally to the top housing. The endblock assembly also provides support for the top housing and hydraulic pump. The external nature of the endblock sub-assembly, including the external support of the hydraulic motor, decreases the size of the hydrostatic transmission. In addition, such configuration increases the modularity of the design, which is more efficient for maintenance and enhances component versatility for different vehicle types. As compared to conventional configurations, therefore, the hydrostatic transmission is more suitable for incorporation into light vehicles, such as for example, turf machines, lawn tractors, ride-on lawn mowers, and like devices, including zero-turn radius vehicles.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Embodiments of the present invention will now be described with reference to the drawings, wherein like reference numerals are used to refer to like elements throughout. It will be understood that the figures are not necessarily to scale.

Figure 1:
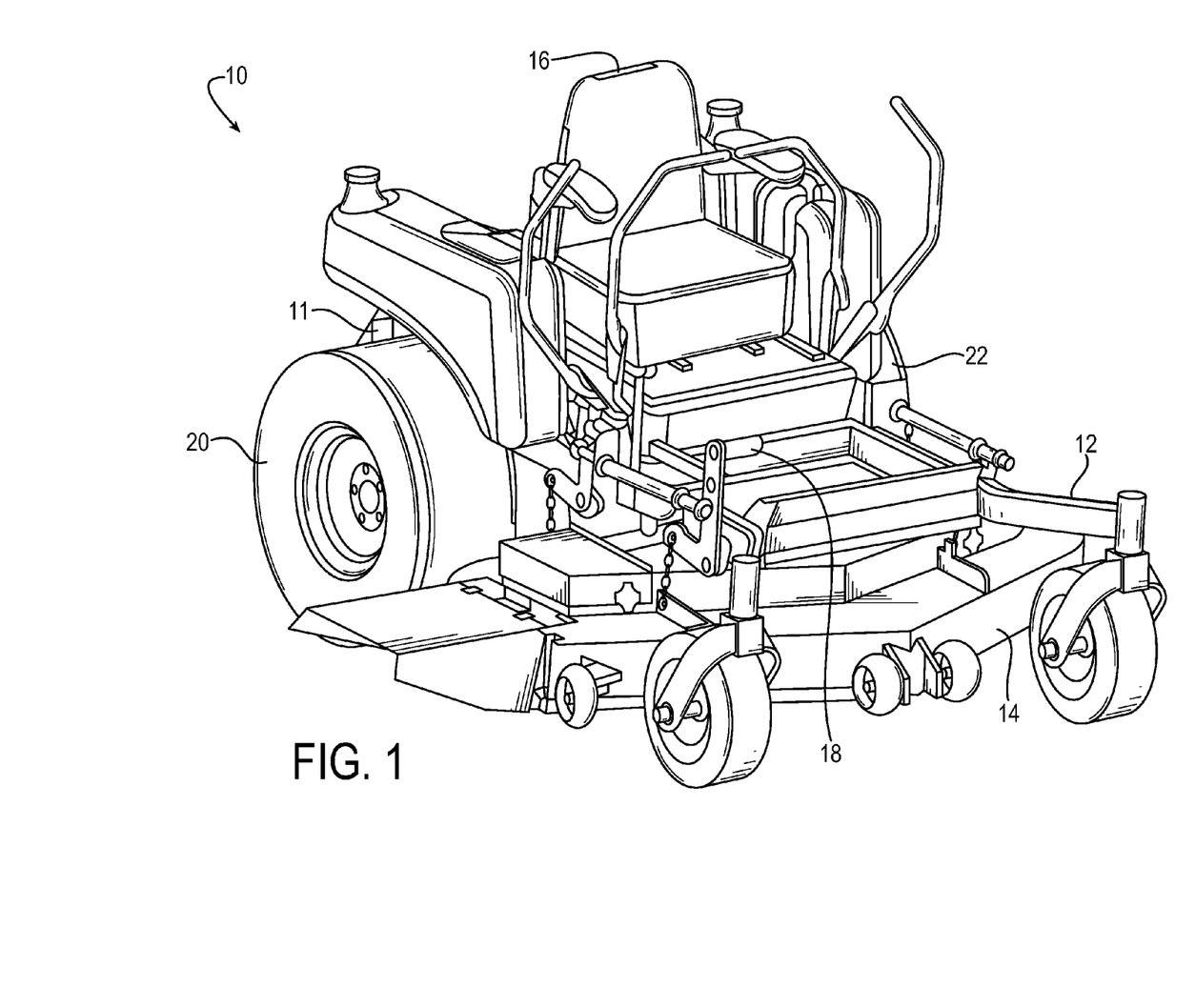
FIG. 1 is a drawing depicting a perspective view of an exemplary zero-turn-radius mower employing a hydrostatic transmission in accordance with embodiments of the present invention.

FIG. 1 is a drawing depicting a perspective view of an exemplary zero-turn-radius mower 10 employing a hydrostatic transmission in accordance with embodiments of the present invention. The mower 10 may include a frame 12, a mower deck 14 supported by the frame 12 for mowing grass, an operator seat 16, and a plurality of controls 18 for operating the mower 10. A rear mounted engine 11 as is known in the art, also referred to as a prime mover, is mounted to the frame 12 behind the seat 16 and provides power to left and right hydrostatic transmissions (the hydrostatic transmissions are not shown in FIG. 1) also mounted to the frame 12. The hydrostatic transmissions can be controlled by an operator to independently drive respective rear wheels 20 to propel the mower and provide zero-turn-radius functionality. The design of the illustrated mower 10 is merely exemplary in nature, and it will be appreciated that other mower designs and vehicle types can be used in accordance with the invention.

An aspect of the invention is a hydrostatic transmission that may be employed in light vehicle configurations. As described further below, in exemplary embodiments the hydrostatic transmission includes a hydraulic pump, a top housing that houses the hydraulic pump, and a hydraulic motor. An endblock sub-assembly has a pump running face for interfacing with the hydraulic pump, and a motor connection portion for interfacing with a hydraulic motor. The enblock sub-assembly forms a porting manifold for communicating hydraulic fluid from the hydraulic pump to the hydraulic motor. The hydraulic motor includes an internal rotor set, and the hydraulic motor is secured to the motor connection portion of the endblock sub-assembly in a manner that permits rotation of the rotor set. The top housing is fixed to the endblock sub-assembly such that the housing and endblock sub-assembly form a reservoir for the hydraulic fluid.

Figure 2:
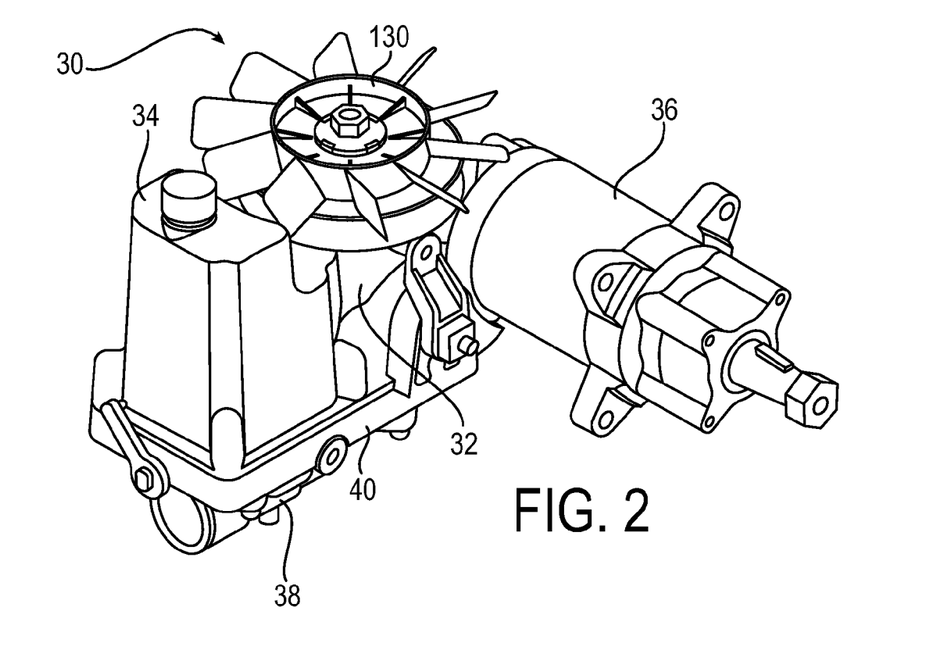
FIG. 2 is a drawing depicting a front perspective view of an exemplary hydrostatic transmission according to embodiments of the present invention.
Figure 3:
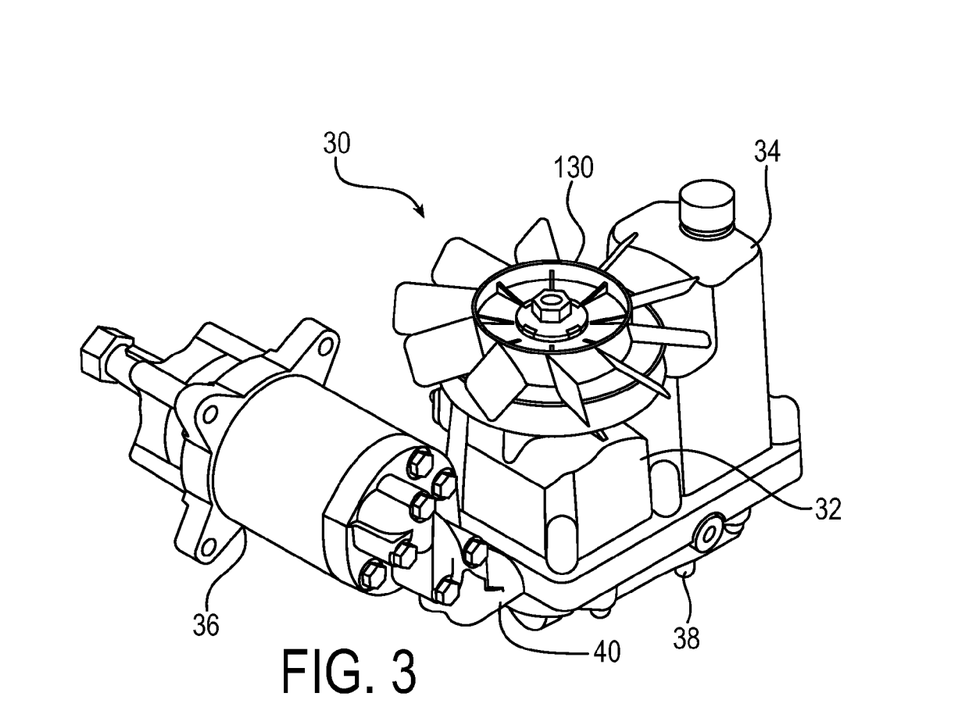
FIG. 3 is a drawing depicting a rear perspective view of the exemplary hydrostatic transmission of FIG. 2.
Figure 4:
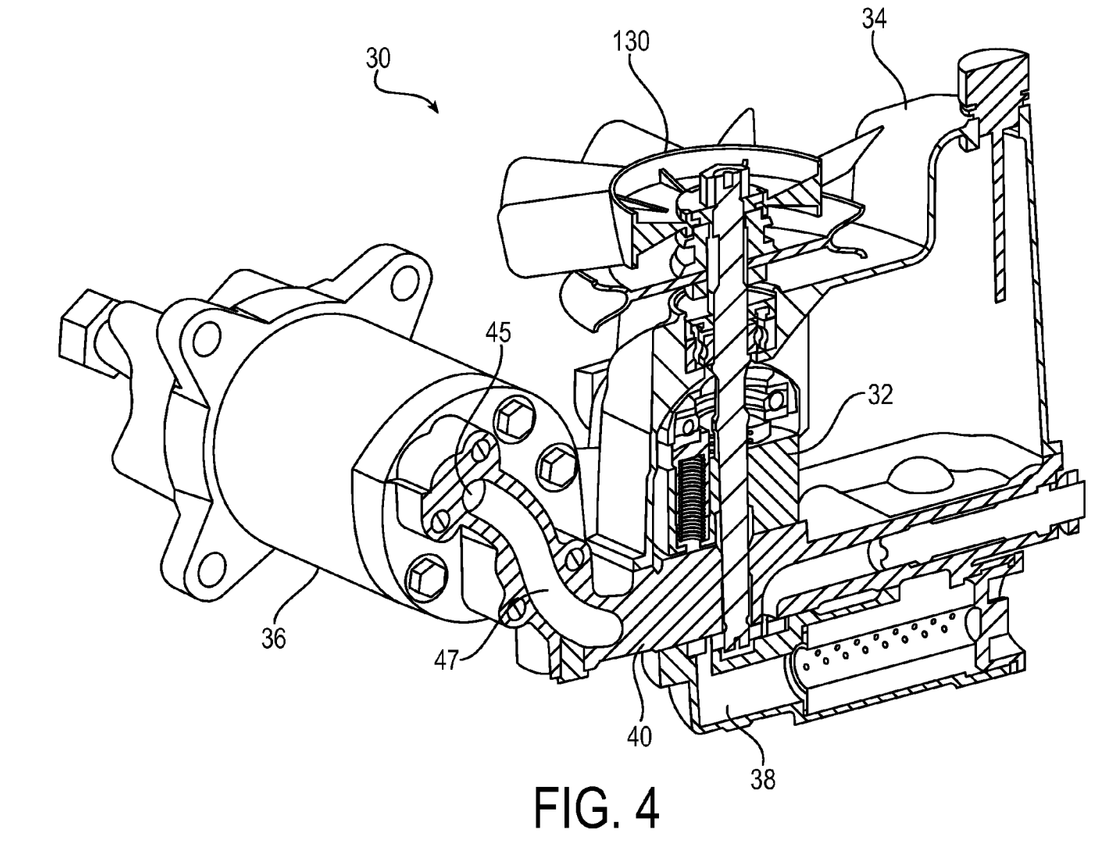
FIG. 4 is a drawing depicting a partial cross-sectional view of the exemplary hydrostatic transmission of FIGS. 1 and 2.
Figure 5:
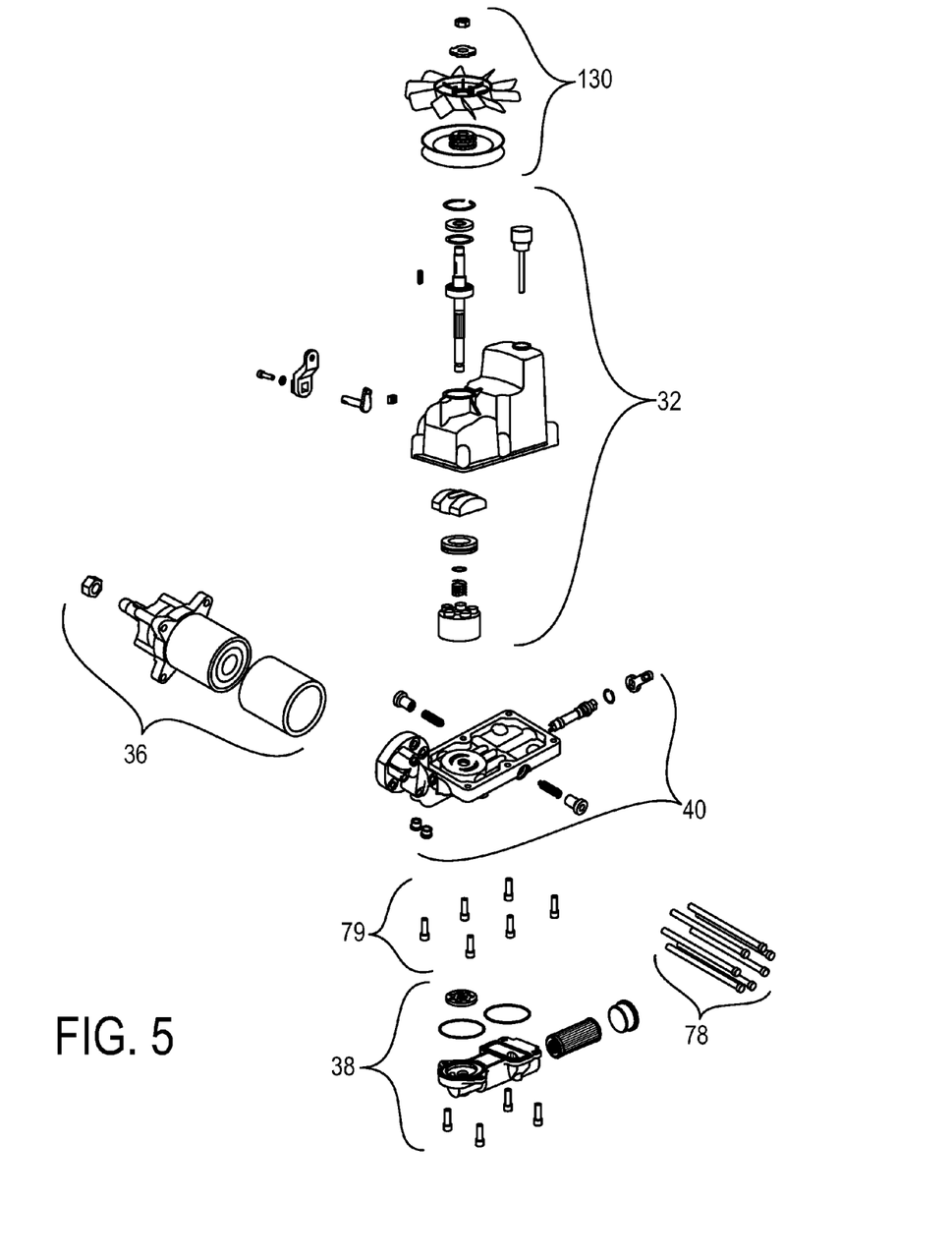
FIG. 5 is a drawing depicting an exploded view of the exemplary hydrostatic transmission of FIGS. 2-4.

FIGS. 2-5 are drawings depicting an exemplary hydrostatic transmission 30 in accordance with embodiments of the present invention. In particular, FIG. 2 is a drawing depicting a front perspective view of the exemplary hydrostatic transmission 30. FIG. 3 is a drawing depicting a rear perspective view of the exemplary hydrostatic transmission 30. FIG. 4 is a drawing depicting a partial cross-sectional view of the exemplary transmission 30. FIG. 5 is a drawing depicting an exploded view of the exemplary hydrostatic transmission 30.

The hydrostatic transmission 30 may be characterized as including the following generalized components. The hydrostatic transmission includes a hydraulic pump assembly 32 enclosed or housed within a top housing 34, and a hydraulic motor assembly 36. A pulley/fan assembly 130 is associated with the hydraulic pump assembly 32. As a component of a hydrostatic transmission 30, an enhanced endblock sub-assembly 40 provides a fluid connection to transmit hydraulic fluid between the pump 32 and the motor 36 of the hydrostatic transmission. In particular, the endblock sub-assembly 40 is coupled to the hydraulic pump assembly 32 and hydraulic motor assembly 36 to transmit hydraulic fluid from the hydraulic pump to the hydraulic motor. The top housing 34 is coupled or fixed to the endblock 40 such that the top housing and endblock cooperate to form a reservoir for the hydraulic fluid, and also form an enclosure for the hydraulic pump. The endblock sub-assembly 40 supports the hydraulic pump assembly 32 within the top housing 34, and the endblock sub-assembly supports the hydraulic motor externally to the top housing. The endblock sub-assembly 40 also supports a charge pump/filter housing assembly 38. Details of these various components are described additionally in connection with the subsequent figures.

Figure 6:
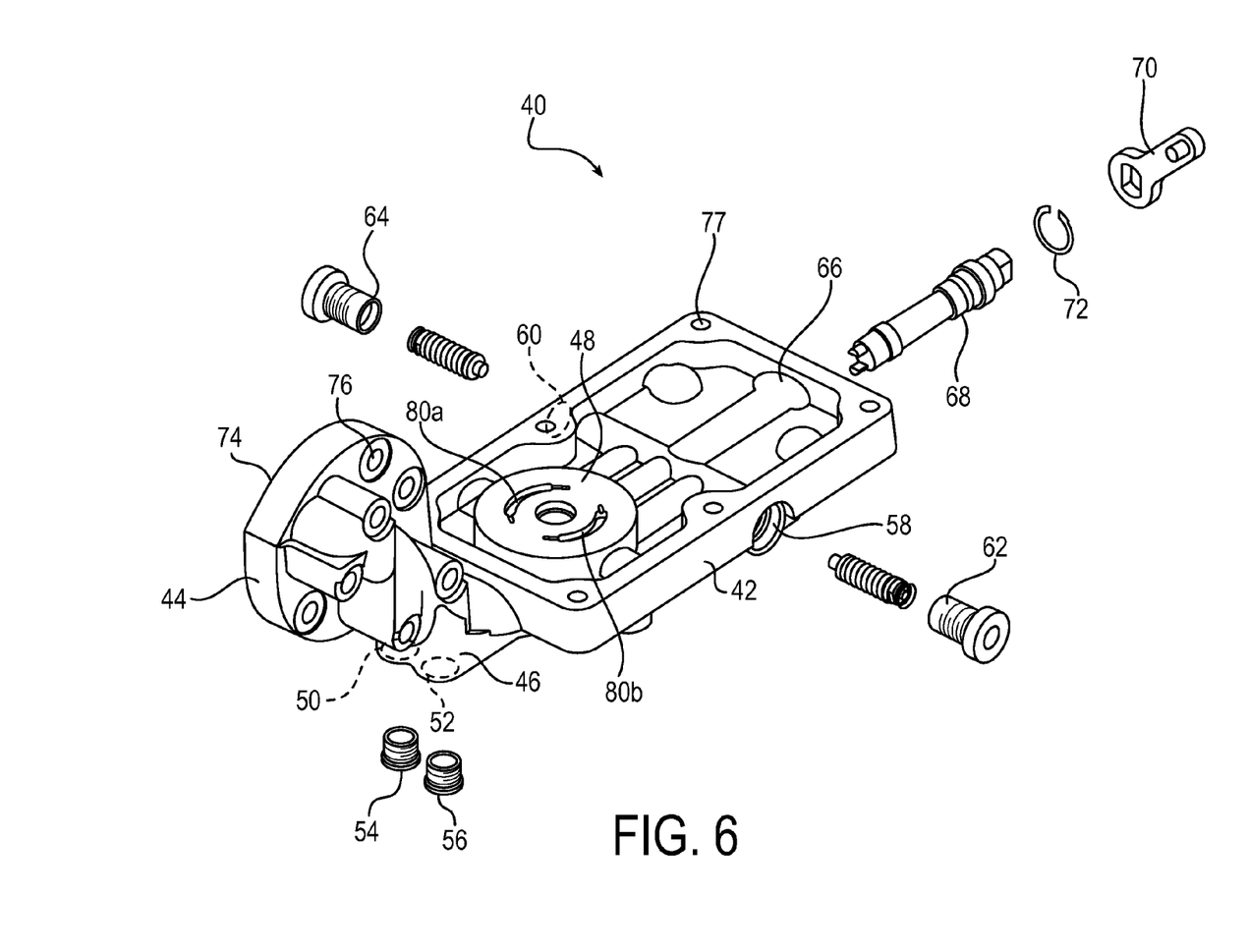
FIG. 6 is a drawing depicting an exploded view of an exemplary endblock sub-assembly of the hydrostatic transmission of FIGS. 2-5.

As a component of a hydrostatic transmission, as referenced above the endblock sub-assembly 40 provides a fluid connection between a pump and a motor within the hydrostatic transmission. FIG. 6 is a drawing depicting an exploded view of an exemplary endblock sub-assembly 40 for the hydrostatic transmission 30. The endblock sub-assembly 40 includes a pump interfacing portion 42 and a motor connection portion 44. The pump interfacing portion and motor connection portion form a porting manifold 46 including internal passages 47 (see the cross-sectional view of FIG. 4) for communicating hydraulic fluid between the hydraulic pump and the hydraulic motor. The pump interfacing portion 42 includes a pump running face 48 that interfaces with the pump components. As further described below, the pump includes a piston-containing barrel that rotates adjacent to the pump running face 48. The pump, therefore, interfaces directly with the endblock sub-assembly 40 at the pump running face.

The endblock sub-assembly 40 also includes first and second ports 50 and 52 extending into first and second flow passages, respectively, for receiving first and second magnetic plugs 54 and 56 respectively. The magnetic plugs are disposed in the first and second ports to capture debris, such as metallic debris, from the hydraulic pump and/or hydraulic motor. The endblock sub-assembly 40 also includes valve ports 58 and 60 for receiving relief valves/plugs 62 and 64 respectively, and a port 66 for receiving a bypass valve 68. The bypass valve is connected to a bypass lever 70 and sealed by a snap ring 72. The bypass lever is operable to short circuit the hydraulic fluid flow so as to render the transmission in a neutral position, which is useful, for example, in circumstances in which the operator may wish to push the vehicle.

The motor connection portion 44 includes a motor running face 74, which acts as an interface between the motor components and the endblock sub-assembly. Referring to FIG. 5 in combination with FIG. 6, motor fastening receivers 76 receive motor fastening elements 78 that secure a motor housing to the endblock sub-assembly in a manner that permits the rotation of internal rotor elements of the motor adjacent to the motor running face 74. In the example shown, the motor is secured to the endblock sub-assembly using seven motor bolts as the fastening elements 78, although any suitable number or type of fastening element may be employed. The endblock sub-assembly orients the pump running face 90° relative to the motor connection portion, and more specifically the motor running face.

As also seen in considering FIGS. 5 and 6 combined, the endblock sub-assembly 40 further includes housing fastening receivers 77 that receive housing fastening elements 79. The housing fastening elements 79 secure the endblock sub-assembly 40 via the housing fastening receivers 77 to the top housing 34. The fastening elements 79 may be a plurality of top housing bolts In this manner, the endblock sub-assembly 40 and top housing 34 form an enclosed reservoir for containing the hydraulic fluid. Specifically, the top portion of the endblock sub-assembly serves as a bottom portion of the hydraulic fluid reservoir. The resultant reservoir may define a sufficient volume in excess of the hydraulic fluid volume constituting an integral fluid expansion volume. The integral fluid expansion volume provides adequate space for the hydraulic fluid to expand during temperature changes, particularly during operation. By providing a reservoir with adequate expansion volume integral in the enclosure formed by the top housing and endblock sub-assembly, the hydraulic fluid of the hydrostatic transmissions for the different wheels are always separate. This configuration has space-saving advantages over conventional configurations that have a common or shared fluid reservoir and expansion volume that accommodates the various wheels. This configuration relatedly eliminates the need for any external expansion reservoir, whether shared or separate for the different wheels, as is required in some conventional configurations.

Continuing to refer to FIG. 6, for fluid communication, the porting manifold 46 formed by the endblock sub-assembly may be configured as follows. The pump interfacing portion 42 includes first and second kidney ports 80a and 80b that extend through the pump running face 48 for interfacing with a pump, and constitute the openings for the first and second internal passages (e.g., passages 47). The kidney ports, therefore, provide a fluid connection with the pump for the entry of hydraulic fluid into the endblock sub-assembly 40 and a return flow. Also referring to the cross-sectional view of FIG. 4, the internal passages 47 (see FIG. 4) may include first and second internal passages from the kidney ports 80a and 80b that end in corresponding motor ports 45 on the motor running face, and the motor ports are raised in elevation relative to the pump kidney ports as seen particularly in FIG. 4. In an exemplary operation of fluid flow, the pump provides fluid flow to port 80a for driving the motor in the forward direction (clockwise rotation of the transmission output shaft when looking at the output shaft). The pump provides flow to port 80b for driving the motor in the reverse direction (counterclockwise rotation of the transmission output shaft when looking at the output shaft). Commensurately, the motor connection portion 44 has corresponding fluid ports for communicating fluid into and out from the motor relative to the endblock sub-assembly 40.

The use of the endblock sub-assembly 40 configured as described above has advantages over conventional configurations. The endblock sub-assembly supports several of the components, including the hydraulic motor portion and the top housing that encloses the pump portion. In addition, as referenced above, when secured to the top housing the endblock sub-assembly forms the bottom portion of the fluid reservoir. In other words, the endblock sub-assembly is external. This is contrast to conventional configurations, in which a larger carrier housing is provided to enclose all the components, including the fluid manifold that communicates hydraulic fluid between the pump and the motor. An advantage of the configuration of the present invention is that overall size of the hydrostatic transmission is reduced. Lateral width of the hydrostatic transmission is reduced in particular. This is significant for zero-turn radius vehicles, in which space is at a premium.

The external nature of the endblock sub-assembly also results in enhanced modularity and versatility as compared to conventional configurations. For example, because the motor is mounted externally to the endblock sub-assembly (for example by the seven motor bolts), the motor can be changed easily to accommodate different vehicle configurations and power needs. Generally, the configuration of the endblock sub-assembly provides for an overall modular design, allowing easy assembly and removal of the various parts. This results in maintenance activities being less complicated and time consuming.

Additional features of the hydrostatic transmission 30 are described with respect to FIGS. 7-12.

Figure 7:
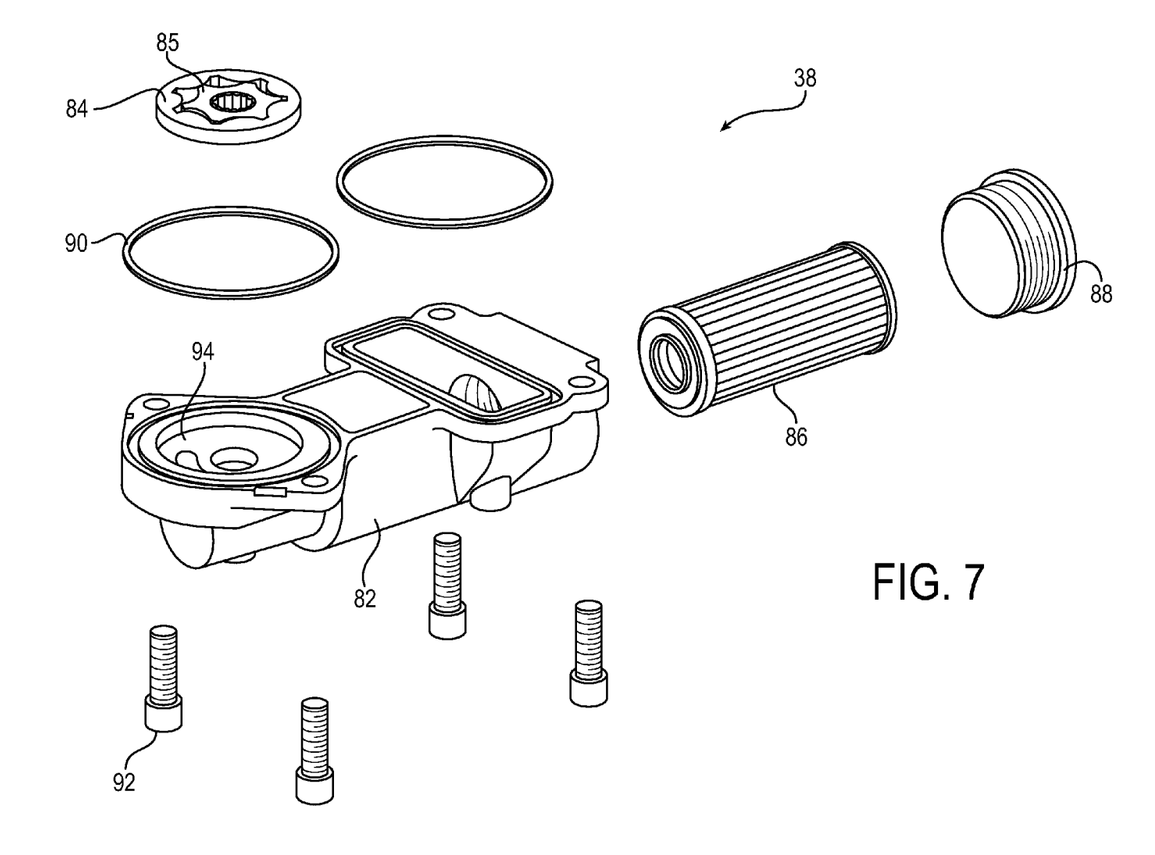
FIG. 7 is a drawing depicting an exploded view of an exemplary charge pump/filter assembly of the hydrostatic transmission of FIGS. 2-5.

FIG. 7 is a drawing depicting an exploded view of a charge pump/filter assembly 38 for the hydrostatic transmission 30, which is coupled to a bottom portion of the endblock sub-assembly. The charge pump/filter assembly 38 includes a charge pump/filter housing 82 that houses a charge pump 84 and a filter 86. The charge pump 84 may include a gerotor assembly 85 that charges the transmission by pumping hydraulic fluid into the hydraulic fluid reservoir. The hydraulic fluid may be pumped through the filter 86, which may be secured within the housing 82 using a filter plug 88. Suitable seals 90, such as O-ring seals, may be employed to seal the housing 82 to the endblock sub-assembly 40, and charge pump fasteners 92, such as bolts, may be used to secure the charge pump/filter assembly 38 to a bottom of the endblock sub-assembly 40. In this manner, a top portion of the charge pump/filter housing 82 abuts the bottom portion of the endblock sub-assembly 40, and the top portion of the charge/pump filter housing includes a recess 94 for receiving the charge pump 84. The charge pump/filter assembly 38, therefore, also is modular in nature and easily accessed for maintenance.

Figure 8:
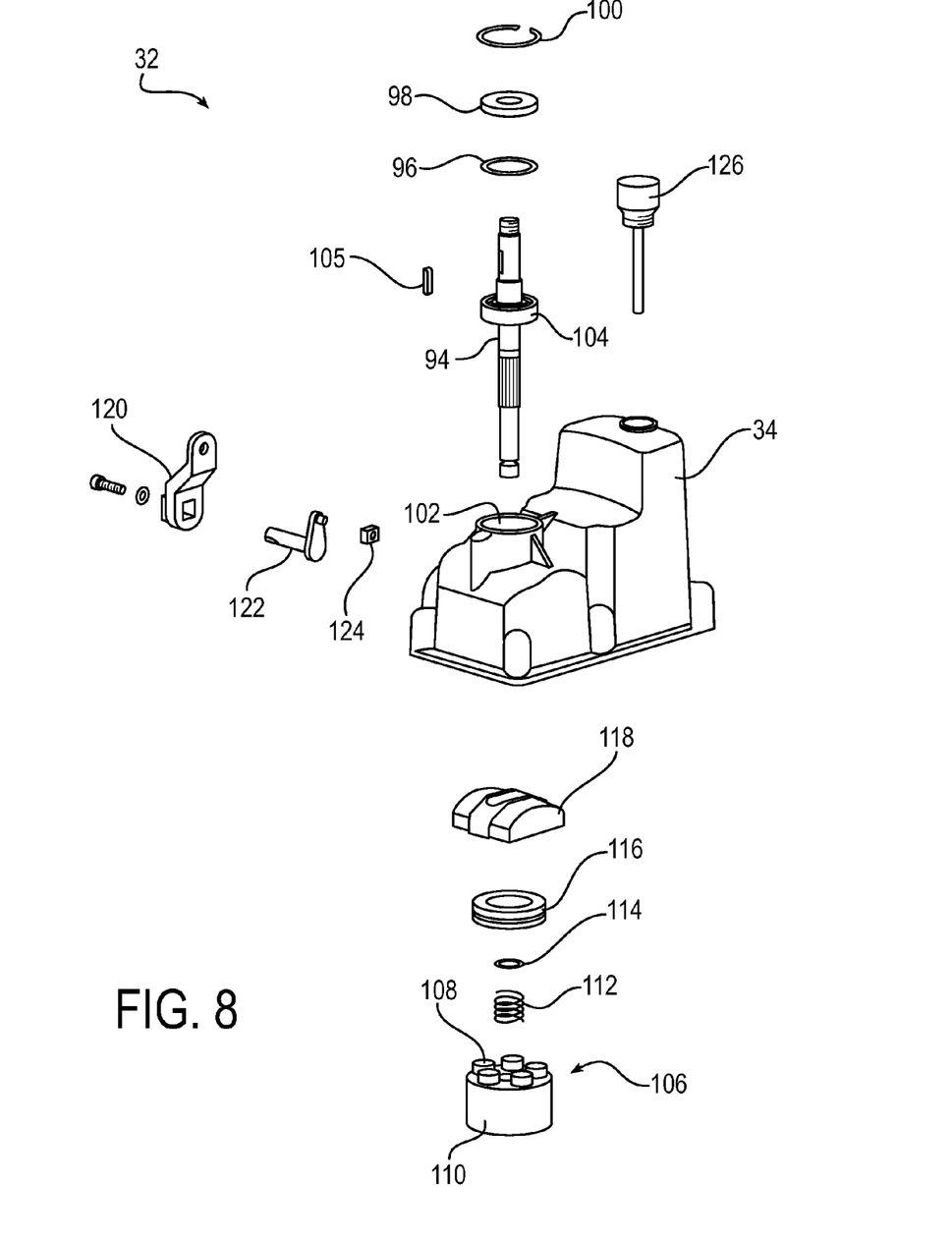
FIG. 8 is a drawing depicting an exploded view of an exemplary hydraulic pump assembly of the hydrostatic transmission of FIGS. 2-5.

FIG. 8 is a drawing depicting an exploded view of an exemplary hydraulic pump assembly 32 of the hydrostatic transmission 30. As seen in FIG. 8, the hydraulic pump assembly 32 includes an input shaft 94 that is sealed with a shaft seal 96 and washer 98 secured by a snap ring 100. The input shaft 94 extends into the top housing 34 through a bore 102 such that a bearing 104 on the input shaft rests within the bore. A piston rotating group 106 includes a plurality of pistons 108 that are supported on a barrel 110. The piston rotating group further includes a barrel spring 112 and washer 114 that support a thrust bearing 116. The input shaft 94 drives the piston rotating group such that the piston rotating group rotates against the pump running face of the endblock sub-assembly and adjacent to a moveable swash plate 118. In operation, the operator effects control via an input lever 120 that operates though a trunion arm 122 and control block 124, which causes a rotation of the moveable swash plate 118. For example, the swash plate may rotate within a range of ±14°. With the rotation of the swash plate, as the pump barrel rotates under the driving force of the input shaft, the pistons extend and contract against the swash plate to drive the hydraulic fluid in and out so as to pump the hydraulic fluid through the endblock sub-assembly to the motor. The input shaft 94 is driven via action on a key 105. A dipstick and breather 126 provides a pressure release mechanism, and can be used to check the hydraulic fluid level in the reservoir.

Figure 9:
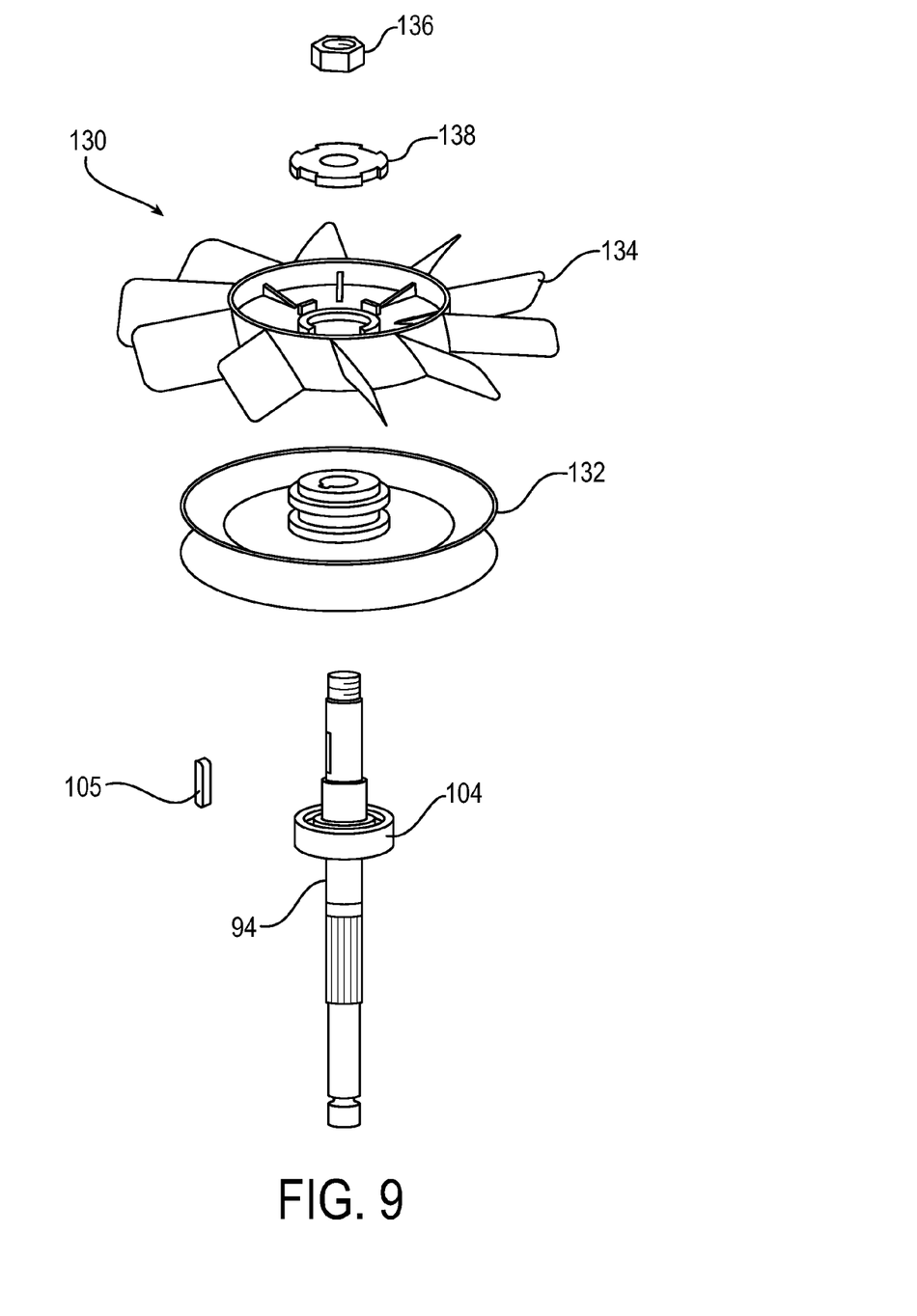
FIG. 9 is a drawing depicting an exploded view of an exemplary pulley/fan assembly for use with the hydraulic pump assembly of FIG. 8.

FIG. 9 is a drawing depicting an exploded view of an exemplary pulley/fan assembly 130 for use with the hydraulic pump assembly of FIG. 8. As seen FIG. 9, a portion of the input shaft 94 extends outward from the top housing. The input shaft further extends through an input belt pulley 132 and a fan 134 that operates to provide cooling for the hydrostatic transmission. Enhanced cooling is provided by mounting the fan to the input shaft directly adjacent to the input belt pulley. The components of the assembly 130 are secured to the top housing by a nut 136 and fan spacer 138.

Figure 10:
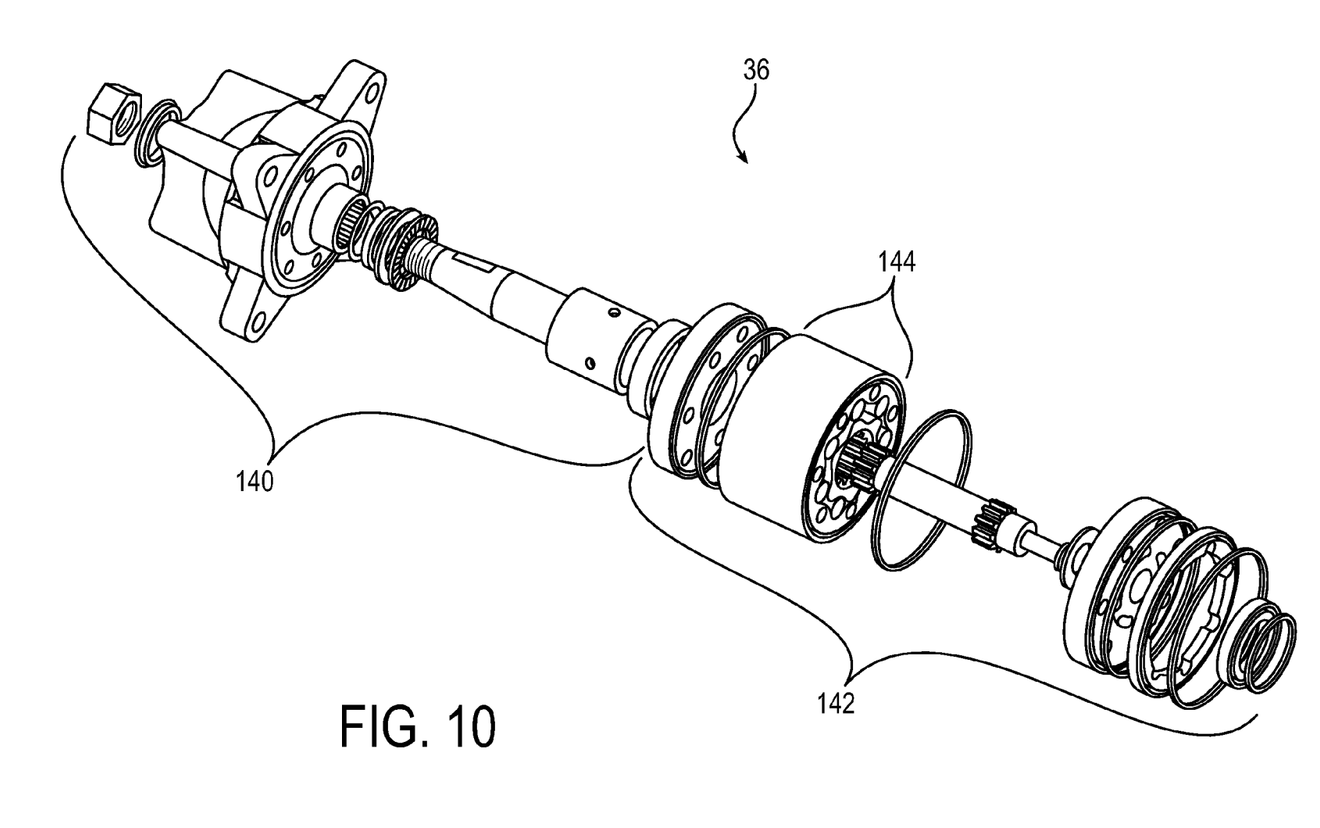
FIG. 10 is a drawing depicting an exploded view of an exemplary hydraulic motor assembly of the hydrostatic transmission of FIGS. 2-5.

FIG. 10 is a drawing depicting an exploded view of the exemplary hydraulic motor assembly 36 of the hydrostatic transmission 30. The hydraulic motor assembly 36 may be characterized as including the generalized components of a motor housing sub-assembly 140 and motor components 142, the motor components 142 including in part a motor rotor set sub-assembly 144. Details of these components are described additionally in connection with subsequent FIGS. 11-12.

Figure 11:
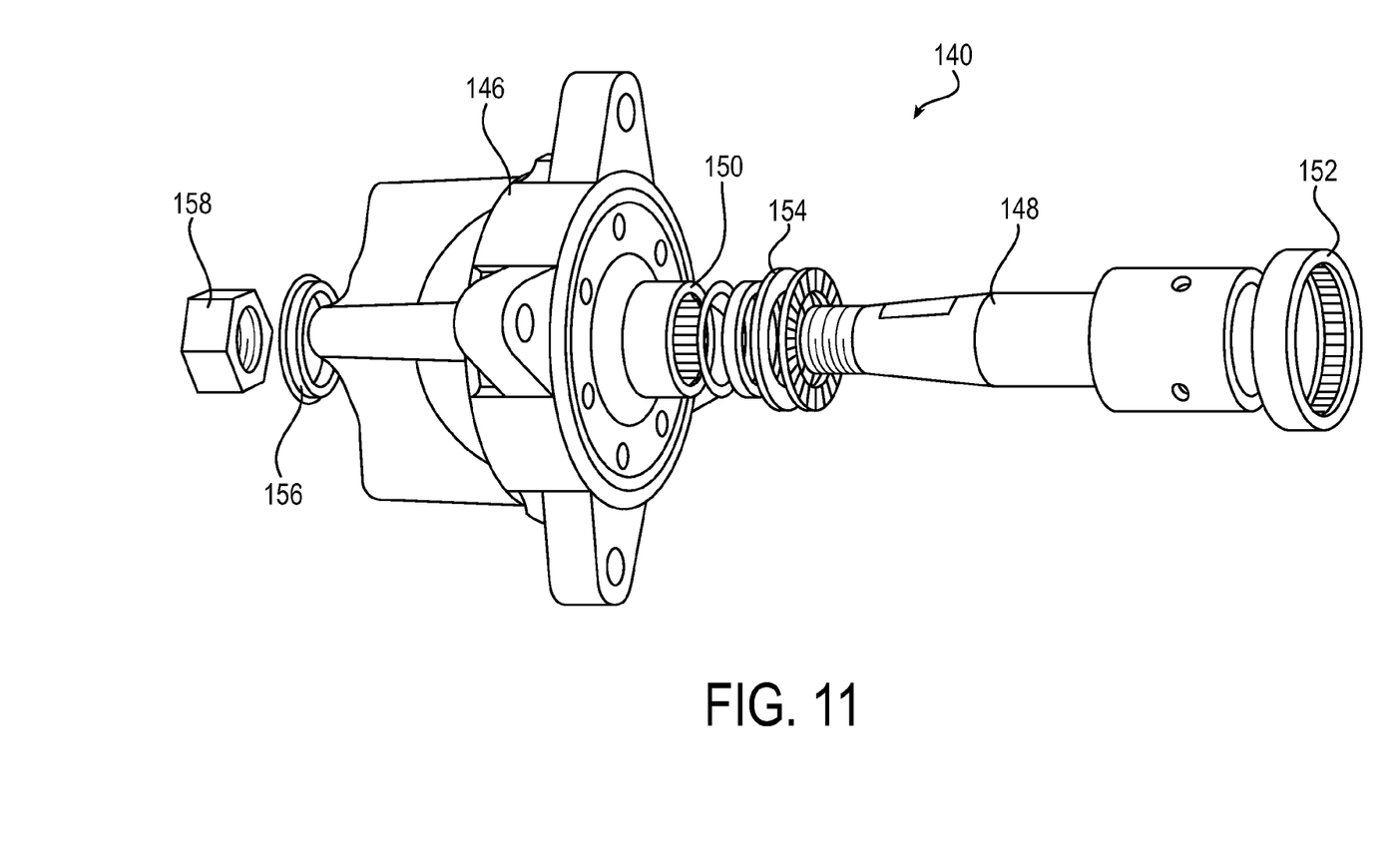
FIG. 11 is a drawing depicting an exploded view of an exemplary motor housing sub-assembly of the hydraulic motor assembly of FIG. 10.

FIG. 11 is a drawing depicting an exploded view of an exemplary motor housing sub-assembly 140 of the hydraulic motor assembly 36. The motor housing sub-assembly 140 may include a motor housing 146 that receives an output shaft 148. The output shaft 148 extends through the motor housing (see, e.g., FIGS. 2 and 3) for ultimately driving a wheel hub, either directly or through a gear reduction assembly as are known in the art. The output shaft 148 is supported in the housing by a front radial bearing 150 and a rear radial bearing 152. Between such bearings, the output shaft is further secured by a plurality bearings, washers, and/or seals 154. On the output end of the output shaft 148, a seal 156 is provided against the motor housing 146, and a wheel nut 158 may be fitted on the driving end of the output shaft.

Figure 12:
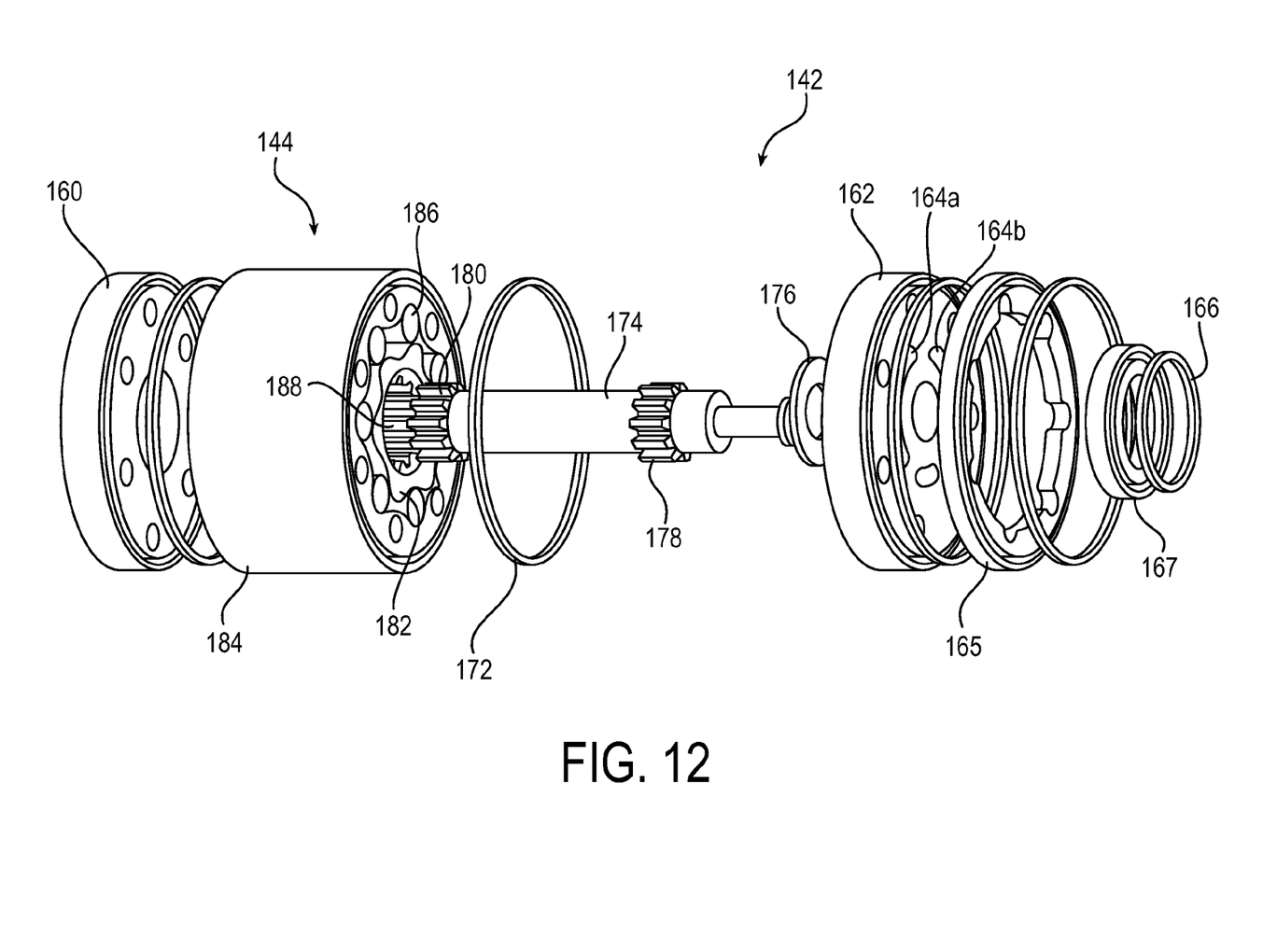
FIG. 12 is a drawing depicting an exploded view of exemplary motor components of the hydraulic motor assembly of FIG. 10.

FIG. 12 is a drawing depicting an exploded view of the exemplary motor components 142 of the hydraulic motor assembly 36. As referenced above, the motor components include a motor rotor set sub-assembly 144, which is described in more detail below. The motor rotor set sub-assembly 144 is secured to the motor housing 146 of FIG. 11 via a wear plate 160. A manifold 162 includes motor kidney ports 164a and 164b that receive hydraulic fluid from the porting of the endblock sub-assembly through the motor facing side. The manifold 162 is supported adjacent commutator ring 165 that encloses a commutator 167 and sealed with a commutator seal 166, and communicates the hydraulic fluid to the rotor set via the manifold 162. The various components are sealed utilizing a plurality of O-ring seals 172.

As seen in FIGS. 5, 6, 11, and 12 in particular, each of the motor connection portion 44 of the endblock sub-assembly 40, the motor housing 146, motor rotor set sub-assembly 144, and manifold 162, includes a plurality aligned receiving holes for receiving a corresponding plurality of fastening elements. In this non-limiting example, there are seven receiving holes for receiving the seven motor bolts 78 to secure the various components of the hydraulic motor assembly 36 to the endblock sub-assembly 40.

Referring again to FIG. 12, the motor components 142 further include a drive link 174 that is supported in position at least in part with a thrust washer 176. The drive link 174 includes first splines 178 that interface with the inner rotor of the motor rotor set sub-assembly 144. The drive link 174 further includes second splines 180 that interface with a cooperating spline of the output shaft 148. Through such interfacing linkages, the motor rotor drives the output shaft via acting on the drive link.

The motor rotor set sub-assembly 144 has a gerotor configuration including an inner rotor 182 that rotates within a motor stator 184 against and relative to a plurality of roller vanes 186. The inner rotor 182 rotates under the force of the hydraulic fluid flow from the pump. Spaces defined between the inner rotor 182 and motor stator 184 change volume as the inner rotor 182 rotates within the motor stator 184 relative to the roller vanes 186. This action permits the inflow and forces the outflow of the hydraulic fluid from the motor, which causes the inner rotor to rotate. Splines 188 of the inner rotor 182 interact with the first splines 178 of the drive link 174 such that the rotation of the inner rotor 182 drives the rotation of the drive link 174. As referenced above, the second splines 180 interface with a cooperating spline of the output shaft 148 in turn to drive the rotation of the output shaft 148.

The described hydrostatic transmission may be incorporated into a light vehicle such as that depicted in FIG. 1. Another aspect of the invention, therefore, is a vehicle. Referring again to FIG. 1, in exemplary embodiments, the vehicle includes a frame 12, a prime mover 11 supported by the frame, at least one driving wheel 20 and at least one hydrostatic transmission 30 as described above supported by the frame and respectively corresponding to each of the at least one driving wheel 20. The prime mover (engine) 11 powers the at least one hydrostatic transmission to drive the at least one driving wheel. The vehicle may be a zero turn radius vehicle, and may be a turf mowing device that has a mower deck 14 supported by the frame, and the prime mover powers the mower deck In accordance with the above description, an aspect of the invention is a hydrostatic transmission. In exemplary embodiments, the hydrostatic transmission includes a hydraulic pump, a top housing that houses the hydraulic pump, an endblock sub-assembly having a pump running face for interfacing with the hydraulic pump and a motor connection portion for interfacing with a hydraulic motor, wherein the enblock sub-assembly forms a porting manifold for communicating hydraulic fluid from the hydraulic pump to the hydraulic motor, and a hydraulic motor including an internal rotor set, wherein the hydraulic motor is secured to the motor connection portion of the endblock sub-assembly in a manner that permits rotation of the rotor set. Top housing is fixed to the endblock sub-assembly such that the housing and endblock sub-assembly form a reservoir for the hydraulic fluid.

In an exemplary embodiment of the hydrostatic transmission, the endblock sub-assembly supports the hydraulic pump and top housing such that the top housing and enblock sub-assembly form an enclosure for the hydraulic pump.

In an exemplary embodiment of the hydrostatic transmission, the motor connection portion of the endblock sub-assembly supports the hydraulic motor externally to the top housing.

In an exemplary embodiment of the hydrostatic transmission, the motor connection portion includes a motor running face that interfaces with the motor.

In an exemplary embodiment of the hydrostatic transmission, the porting manifold comprises internal flow passages between pump kidney ports on the pump running face and motor ports on the motor running face, and the motor ports are raised in elevation relative to the pump kidney ports.

In an exemplary embodiment of the hydrostatic transmission, the pump running face is oriented 90° relative to the motor connection portion.

In an exemplary embodiment of the hydrostatic transmission, the endblock sub-assembly includes first and second ports respectively extending into the internal flow passages for respectively receiving first and second magnetic plugs. The hydrotstatic transmission further includes first and second magnetic plugs disposed in the first and second ports respectively, wherein the first and second magnetic plugs are configured to capture debris from the hydraulic pump and hydraulic motor.

In an exemplary embodiment of the hydrostatic transmission, a top portion of the endblock sub-assembly serves as a bottom portion of the hydraulic fluid reservoir.

In an exemplary embodiment of the hydrostatic transmission, the endblock sub-assembly includes ports for receiving at least one relief valve and at least one bypass valve.

In an exemplary embodiment of the hydrostatic transmission, the hydrostatic transmission further includes a charge pump/filter assembly coupled to a bottom portion of the endblock sub-assembly.

In an exemplary embodiment of the hydrostatic transmission, the charge pump/filter assembly comprises a charge pump/filter housing that houses a charge pump and a filter.

In an exemplary embodiment of the hydrostatic transmission, a top portion of the charge pump/filter housing abuts the bottom portion of the endblock sub-assembly, and the top portion of the charge/pump filter housing includes a recess for receiving the charge pump.

In an exemplary embodiment of the hydrostatic transmission, the hydraulic pump includes an input shaft, a piston rotating group that rotates adjacent the pump running face of the endblock sub-assembly, and a moveable swash plate. The input shaft drives the piston rotating group such that pistons of the rotating group extend and contract against the swash plate to pump the hydraulic fluid.

In an exemplary embodiment of the hydrostatic transmission, the internal rotor set of the hydraulic motor has a gerotor configuration comprising an inner rotor that rotates against a plurality of roller vanes.

In an exemplary embodiment of the hydrostatic transmission, the hydraulic motor includes a manifold that has ports for receiving hydraulic fluid from the endblock sub-assembly and for communicating the hydraulic fluid to the internal rotor set.

In an exemplary embodiment of the hydrostatic transmission, the hydrostatic transmission further includes a drive link, wherein the drive link has first splines for interfacing with the rotor set, and the rotor set drives the drive link as the rotor set rotates.

In an exemplary embodiment of the hydrostatic transmission, the hydrostatic transmission further includes an output shaft, wherein the drive link has second splines for interfacing with a cooperating spline of the output shaft such that the rotor set drives the output shaft via acting on the drive link.

Another aspect of the invention is a vehicle. In exemplary embodiments, the vehicle includes a frame, a prime mover supported by the frame, at least one driving wheel, and at least one hydrostatic transmission supported by the frame and respectively corresponding to the at least one driving wheel. The prime mover powers the at least one hydrostatic transmission to drive the at least one driving wheel.

In an exemplary embodiment of the vehicle, the vehicle is a zero turn radius vehicle.

In an exemplary embodiment of the vehicle, the vehicle further includes a mower deck supported by the frame, and the prime mover further powers the mower deck.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydrostatic transmission comprising:
    a hydraulic pump;
    a top housing that houses the hydraulic pump;
    an endblock sub-assembly having a pump running face for interfacing with the hydraulic pump and a motor connection portion for interfacing with a hydraulic motor, wherein the enblock sub-assembly forms a porting manifold for communicating hydraulic fluid from the hydraulic pump to the hydraulic motor; and
    a hydraulic motor including an internal rotor set, wherein the hydraulic motor is secured to the motor connection portion of the endblock sub-assembly in a manner that permits rotation of the rotor set;
    wherein the top housing is fixed to the endblock sub-assembly such that the housing and endblock sub-assembly form a reservoir for the hydraulic fluid.

2. The hydrostatic transmission of claim 1, wherein the endblock sub-assembly supports the hydraulic pump and top housing such that the top housing and enblock sub-assembly form an enclosure for the hydraulic pump.

3. The hydrostatic transmission of claim 1, wherein the motor connection portion of the endblock sub-assembly supports the hydraulic motor externally to the top housing.

4. The hydrostatic transmission of any claim 1, wherein the motor connection portion includes a motor running face that interfaces with the motor.

5. The hydrostatic transmission of claim 1, wherein the porting manifold comprises internal flow passages between pump kidney ports on the pump running face and motor ports on the motor running face, and the motor ports are raised in elevation relative to the pump kidney ports.

6. The hydrostatic transmission of claim 1, wherein the pump running face is oriented 90° relative to the motor connection portion.

7. The hydrostatic transmission of claim 1, wherein the endblock sub-assembly includes first and second ports respectively extending into the internal flow passages for respectively receiving first and second magnetic plugs,
    the hydrostatic transmission further comprising first and second magnetic plugs disposed in the first and second ports respectively, wherein the first and second magnetic plugs are configured to capture debris from the hydraulic pump and hydraulic motor.

8. The hydrostatic transmission of claim 1, wherein a top portion of the endblock sub-assembly serves as a bottom portion of the hydraulic fluid reservoir.

9. The hydrostatic transmission of claim 1, wherein the endblock sub-assembly includes ports for receiving at least one relief valve and at least one bypass valve.

10. The hydrostatic transmission of claim 1, further comprising a charge pump/filter assembly coupled to a bottom portion of the endblock sub-assembly.

11. The hydrostatic transmission of claim 10, wherein the charge pump/filter assembly comprises a charge pump/filter housing that houses a charge pump and a filter.

12. The hydrostatic transmission of claim 11, wherein a top portion of the charge pump/filter housing abuts the bottom portion of the endblock sub-assembly, and the top portion of the charge/pump filter housing includes a recess for receiving the charge pump.

13. The hydrostatic transmission of claim 1, wherein the hydraulic pump comprises:
    an input shaft;
    a piston rotating group that rotates adjacent the pump running face of the endblock sub-assembly; and
    a moveable swash plate;

wherein the input shaft drives the piston rotating group such that pistons of the rotating group extend and contract against the swash plate to pump the hydraulic fluid.

14. The hydrostatic transmission of claim 1, wherein the internal rotor set of the hydraulic motor has a gerotor configuration comprising an inner rotor that rotates against a plurality of roller vanes.

15. The hydrostatic transmission of claim 1, wherein the hydraulic motor includes a manifold that has ports for receiving hydraulic fluid from the endblock sub-assembly and for communicating the hydraulic fluid to the internal rotor set.

16. The hydrostatic transmission of claim 1, further comprising a drive link, wherein the drive link has first splines for interfacing with the rotor set, and the rotor set drives the drive link as the rotor set rotates.

17. The hydrostatic transmission of claim 16, further comprising an output shaft, wherein the drive link has second splines for interfacing with a cooperating spline of the output shaft such that the rotor set drives the output shaft via acting on the drive link.

18. A vehicle comprising:
a frame;
a prime mover supported by the frame;
at least one driving wheel; and
at least one hydrostatic transmission of claim 1 supported by the frame and respectively corresponding to the at least one driving wheel;
wherein the prime mover powers the at least one hydrostatic transmission to drive the at least one driving wheel.

19. The vehicle according to 18, wherein the vehicle is a zero turn radius vehicle.

20. The vehicle according to claim 18, further comprising a mower deck supported by the frame, and the prime mover further powers the mower deck.

* * * * *